US006593264B2

(12) United States Patent
Lin et al.

(10) Patent No.: US 6,593,264 B2
(45) Date of Patent: Jul. 15, 2003

(54) CATALYTIC REFORMING CATALYST ACTIVATION

(75) Inventors: Fan-Nan Lin, Bartlesville, OK (US); John S. Parsons, Bartlesville, OK (US); Donald H. Macahan, Borger, TX (US); Brian H. Limoges, Borger, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/175,922

(22) Filed: Jun. 20, 2002

(65) Prior Publication Data
US 2002/0195374 A1 Dec. 26, 2002

Related U.S. Application Data

(60) Provisional application No. 60/300,498, filed on Jun. 22, 2001.

(51) Int. Cl.[7] .................. B01J 38/42; B01J 20/34; B01J 23/90; C10G 35/06
(52) U.S. Cl. .................. 502/35; 208/139; 208/140; 208/137; 208/134
(58) Field of Search .................. 208/139–141, 208/134, 137; 502/34, 35, 37–39, 49, 50, 52, 53

(56) References Cited

U.S. PATENT DOCUMENTS

| | | | | |
|---|---|---|---|---|
| 3,622,520 A | * | 11/1971 | Hayes .................. | 252/415 |
| 3,625,860 A | * | 12/1971 | Condrasky et al. .......... | 252/415 |
| 3,637,524 A | * | 1/1972 | Johnson et al. ............. | 252/415 |
| 3,939,061 A | * | 2/1976 | Paynter et al. ............. | 208/140 |
| 3,943,052 A | * | 3/1976 | Kmak et al. ................ | 208/140 |
| 3,950,270 A | * | 4/1976 | Paynter et al. ............. | 252/464 |
| 3,981,823 A | * | 9/1976 | Yates ........................ | 252/415 |
| 3,986,982 A | * | 10/1976 | Crowson et al. ............ | 252/415 |
| 4,810,683 A | * | 3/1989 | Cohn et al. .................. | 502/37 |
| RE34,250 E | | 5/1993 | Van Leirsburg et al. ...... | 502/37 |
| 5,654,247 A | * | 8/1997 | Lin et al. .................... | 522/53 |
| 5,698,486 A | | 12/1997 | Fung et al. .................. | 502/37 |
| 5,705,731 A | * | 1/1998 | Lin et al. .................... | 502/748 |
| 5,726,112 A | | 3/1998 | Fung et al. .................. | 502/35 |
| 5,756,414 A | | 5/1998 | Huang et al. ................ | 502/37 |
| 5,763,348 A | | 6/1998 | Fung et al. .................. | 502/37 |
| 5,776,849 A | | 7/1998 | Fung et al. .................. | 502/37 |
| 5,854,162 A | * | 12/1998 | Dufresne et al. ............. | 502/45 |
| 5,866,495 A | | 2/1999 | Fung et al. .................. | 502/37 |
| 6,291,381 B1 | | 9/2001 | Lin et al. ..................... | 502/35 |
| 6,294,492 B1 | | 9/2001 | Lin ............................ | 502/35 |

* cited by examiner

Primary Examiner—Wayne A. Langel
Assistant Examiner—Jonas N. Strickland
(74) Attorney, Agent, or Firm—Jeffrey R. Anderson

(57) ABSTRACT

A reforming catalyst containing a Group VIII metal, or a Group VII B metal, or tin, or germanium, or copper, or selenium or combinations of any two or more metals or oxides thereof is activated by: a) continuously flowing a reducing gas over the catalyst for contact with the catalyst; (b) during step a), flowing a halogen-containing compound over the catalyst for contact with the catalyst for a first time period, wherein the first time period is greater than about 1 minute, and wherein the first time period is less than about 60 minutes; and (c) following step b), and during step a), substantially discontinuing the flow of the halogen-containing compound over the catalyst for a second time period, wherein the second time period is greater than about 1 minute. Alternatively, the catalyst can be activated in an activation zone by: 1) removing water from the activation zone; 2) reducing iron oxide contained in the activation zone in the presence of a reducing gas thereby forming reduced iron and water; 3) removing water from the activation zone; 4) reducing the metal oxide of the catalyst in the presence of a reducing gas thereby forming reduced metal and water; 5) removing water from the activation zone; 6) during step 4), flowing a halogen-containing compound over the catalyst for contact with the catalyst for a first time period; and 7) following step 6) and during step 4), substantially discontinuing the flow of halogen-containing compound over the catalyst for a second time period.

109 Claims, 1 Drawing Sheet

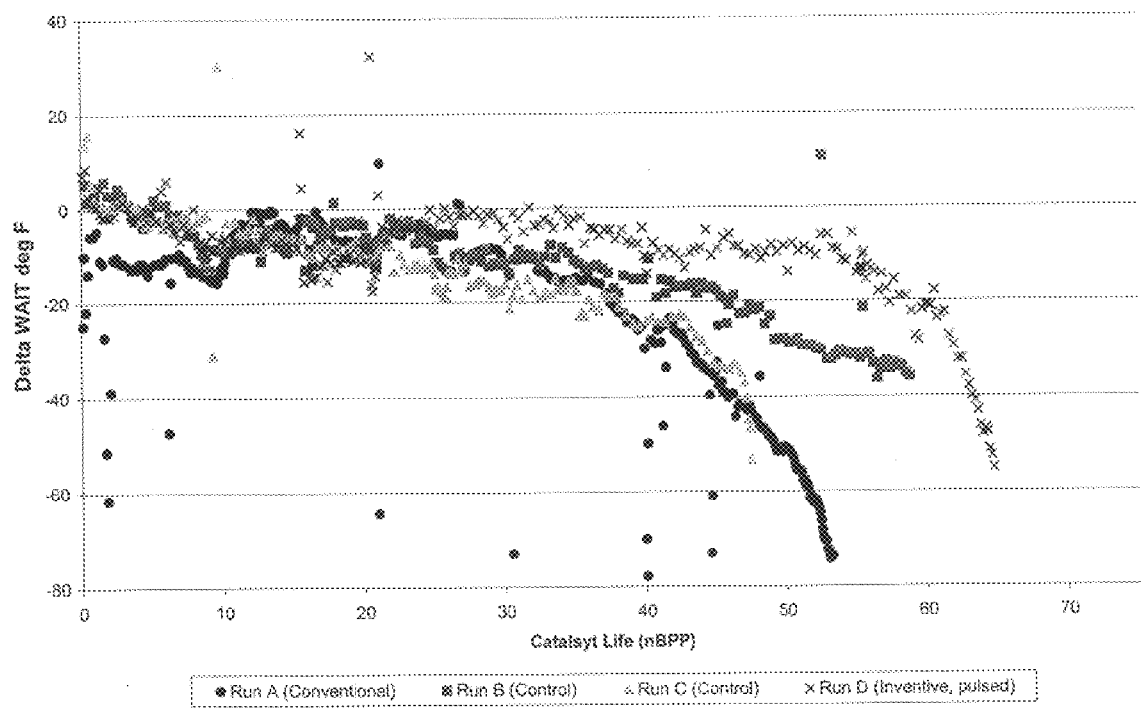

CATALYTIC REFORMING CATALYST ACTIVATION

This application claims the benefit of U.S. Provisional Application Serial No. 60/300,498, filed Jun. 22, 2001.

This invention relates to the regeneration and activation of reforming catalysts and the use of such activated catalysts in the reforming of hydrocarbons.

BACKGROUND OF THE INVENTION

Catalytic reforming, or hydroforming, is a well established industrial process employed by the petroleum industry for improving the octane quality of naphthas or straight run gasolines. In reforming, a multi-functional catalyst is employed which typically contains a metal hydrogenation-dehydrogenation (hydrogen transfer) component or components, such as Group VIII or Group VIIB metals, substantially atomically dispersed upon the surface of a porous inorganic oxide support, notably alumina.

In a conventional reforming process, a series of reactors constitute the heart of the reforming unit. Each reforming reactor is generally provided with a fixed bed or beds of the catalyst which receive upflow or downflow feed. Each reactor is provided with a heater because the reactions which take place therein are endothermic. In a conventional reforming process, a naphtha feed with hydrogen or hydrogen recycle gas is passed through a preheat furnace, then downward through a reactor, and then in sequence through subsequent interstage heaters and reactors of the series. The product of the last reactor is separated into a liquid fraction and a vaporous effluent. The vaporous effluent, a gas rich in hydrogen, is often used as hydrogen recycle gas in the reforming process.

During operation, the activity of the reforming catalyst gradually declines due to the build-up of coke, and the temperature of the process is gradually raised to compensate for the activity loss caused by the coke deposits. Eventually, economics dictate the necessity of regenerating the catalyst.

The initial phase of catalyst regeneration is accomplished by burning the coke off the catalyst under controlled conditions. Catalyst regeneration is then completed through a sequence of activation steps wherein the agglomerated metal hydrogenation-dehydrogenation components are atomically redispersed. Such activation generally is achieved by treating the catalyst with hydrogen to effect reduction of the metal oxide(s) present in the catalyst system, followed by a halogen treatment of the reduced catalyst system prior to placing it back into use.

In addition to the activation process required when working with a catalyst which has been subjected to regeneration by burning off coke from the catalyst, there is generally carried out an activation treatment of the initially charged catalyst to the reactor prior to the introduction of hydrocarbon feed to the system.

In both the activation of fresh catalyst as well as the activation of a regenerated catalyst there have been numerous efforts to achieve a catalyst system whereby the catalyst will have increased activity and increased catalyst life.

SUMMARY OF THE INVENTION

It is an object of the present invention to provide a process for the regeneration and activation of a reforming catalyst.

Another object of the invention is to provide an improved process for the regeneration and activation of a reforming catalyst whereby the catalyst activity is increased.

A still further object of this invention is to provide an improved process for the regeneration and activation of a reforming catalyst whereby the catalyst life is increased.

In accordance with one aspect of the present invention, a process for activating a catalyst is provided and comprises the steps of:
  a) continuously flowing a reducing gas over the catalyst for contact with the catalyst;
  (b) during step a), flowing a halogen-containing compound over the catalyst for contact with the catalyst for a first time period, wherein the first time period is greater than about 1 minute, and wherein the first time period is less than about 60 minutes; and
  (c) following step b), and during step a), substantially discontinuing the flow of the halogen-containing compound over the catalyst for a second time period, wherein the second time period is greater than about 1 minute.

In accordance with another aspect of the present invention, a process for activating a catalyst is provided and comprises the steps of:
  a) providing an activation zone containing water, an iron oxide, and a catalyst comprising at least one metal oxide selected from the group consisting of a Group VIII metal oxide, a Group VIIB metal oxide, tin oxide, germanium oxide, copper oxide, selenium oxide and combinations thereof;
  b) removing at least a portion of the water from the activation zone;
  c) reducing the iron oxide in the presence of a first reducing gas thereby forming reduced iron and a first produced water;
  d) removing at least a portion of the first produced water from the activation zone;
  e) reducing the at least one metal oxide of the catalyst by continuously flowing a second reducing gas over the catalyst for contact with the catalyst; thereby forming at least one reduced metal and a second produced water;
  f) removing at least a portion of the second produced water from the activation zone;
  (g) during step e), flowing a halogen-containing compound over the catalyst for contact with the catalyst for a first time period, wherein the first time period is greater than about 1 minute, and wherein the first time period is less than about 60 minutes; and
  (h) following step g), and during step e), substantially discontinuing the flow of the halogen-containing compound over the catalyst for a second time period, wherein the second time period is greater than about 1 minute.

In accordance with another aspect of the present invention, a process for activating a catalyst is provided and comprises the steps of:
  a) heating a catalyst in an activation zone to a temperature in the range of from about 100 to about 600° F., wherein the catalyst comprises at least one metal oxide selected from the group consisting of a Group VIII metal oxide, a Group VIIB metal oxide, tin oxide, germanium oxide, copper oxide, selenium oxide and combinations thereof;
  b) withdrawing water from the activation zone during the heating of step a);
  c) heating the catalyst in the activation zone and in the presence of a first reducing gas to a temperature in the range of from about 650 to about 840° F., thus producing a first produced water, at a first point in time at which the rate of water withdrawal in step b) from the activation zone is below about 0.00004 gallon of water per pound of the catalyst in the activation zone;

d) withdrawing at least a portion of the first produced water from the activation zone during the heating of step c);

e) heating the catalyst in the activation zone to a temperature in the range of from about 850 to about 940° F. and continuously flowing a second reducing gas over the catalyst for contact with the catalyst, thus producing a second produced water, at a second point in time at which the rate of the first produced water withdrawal in step d) from the activation zone is below about 0.00004 gallon of water per pound of the catalyst in the activation zone;

f) withdrawing at least a portion of the second produced water from the activation zone during the heating of step e);

g) maintaining the temperature of the catalyst in the activation zone in the range of from about 850 to about 940° F. until a third point in time at which the rate of the second produced water withdrawal in step f) is below about 0.00004 gallon of water per pound of the catalyst in the activation zone;

h) during step e), flowing a halogen-containing compound over the catalyst for contact with the catalyst for a first time period, wherein the first time period is greater than about 1 minute, and wherein the first time period is less than about 60 minutes; and i) following step h), and during step e), substantially discontinuing the flow of the halogen-containing compound over the catalyst for a second time period, wherein the second time period is greater than about 1 minute.

Other aspects, objects and the several advantages of the invention will be apparent from the following description and appended claims.

DETAILED DESCRIPTION OF THE INVENTION

The catalyst to be activated by the process of the present invention can be any catalyst comprising, consisting of, or consisting essentially of at least one metal selected from the group consisting of a Group VIII metal, a Group VII B metal (in accordance with the CAS version of the Periodic Table of the Elements), tin, germanium, copper, selenium and combinations of any two or more of such metals or oxides thereof. The catalyst also typically includes a support material. Examples of suitable support materials include, but are not limited to, alumina, halogenated alumina, silica, titania, zirconia, aluminosilicates, zinc spinels such as zinc aluminate and zinc titanate, and combinations of any two or more thereof. The preferred support material is alumina or halogenated alumina. Suitable metals or oxides thereof include, but are not limited to, iron, ruthenium, osmium, cobalt, rhodium, iridium, nickel, palladium, platinum, manganese, technetium, rhenium, tin, germanium, copper, selenium and combinations of any two or more thereof.

The catalyst to be activated can be either a fresh catalyst or a catalyst that has been deactivated. If the catalyst is a deactivated catalyst, then it is preferably subjected to an oxidation step, prior to the activation of the present invention, in order to remove carbonaceous deposits on and in the catalyst.

The activation can be performed in an activation zone containing, comprising, consisting of or consisting essentially of water, an iron oxide, and a catalyst comprising at least one metal oxide, as described above. The water present can be in the form of free water or water associated with the surface of the catalyst. The activation zone most typically includes a reactor or series of reactors wherein the catalyst contacts petroleum hydrocarbons during operation thereby catalyzing the reforming of such petroleum hydrocarbons. More typically, the activation zone includes multiple reaction zones, (or multiple catalyst containment zones). Most typically, the activation zone includes 3 or 4 reaction zones (or catalyst containment zones).

In accordance with one aspect of the present invention, the catalyst activation process comprises, consists of, or consists essentially of the following steps.

(a) A reducing gas continuously flows over the catalyst for contact with the catalyst. The reducing gas can comprise a gas selected from the group consisting of hydrogen, hydrogen sulfide, and combinations thereof.

(b) During the continuous flowing of the reducing gas over the catalyst in step (a), a halogen-containing compound can flow over the catalyst for contact with the catalyst for a first time period, wherein the first time period is greater than about 1 minute, preferably greater than about 2 minutes, more preferably greater than about 5 minutes, and most preferably greater than about 10 minutes; and wherein the first time period is less than about 60 minutes, preferably less than about 40 minutes, more preferably less than about 30 minutes, and most preferably less than about 20 minutes.

(c) During the continuous flowing of the reducing gas over the catalyst in step (a), and following the flowing of the halogen-containing compound over the catalyst in step (b), ceasing, discontinuing or substantially discontinuing the flow of halogen-containing compound over the catalyst for a second time period, wherein the second time period is greater than about 1 minute, preferably greater than about 2 minutes, more preferably greater than about 5 minutes, and most preferably greater than about 10 minutes.

The process can further include repeating steps b) and c) at least once, or until sufficient halogen has been added to the catalyst to produce an activated catalyst. Preferably, steps b) and c) are repeated until in the range of from about 0.01 wt. % to about 2.0 wt. % halogen, more preferably until in the range of from about 0.05 wt. % to about 0.4 wt. % halogen, and most preferably until in the range of from about 0.1 wt. % to about 0.2 wt. % halogen, on an elemental basis, is added to the catalyst, based on the total weight of the catalyst.

The halogen-containing compound can comprise a compound selected from the group consisting of a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations of any two or more thereof. The presently most preferred halogen-containing compound is perchloroethylene.

The temperature employed during the activation process must be sufficient so as to effect decomposition of the chlorine-containing compound. The activation process can be performed at a temperature of from about 500° F. to about 1,500° F., preferably from about 700° F. to about 1,200° F., and most preferably from about 900° F. to or about 940° F., and a pressure in the range of about 0 to about 600 psig, preferably about 50 to about 300 psig.

For a multiple reaction zone system, steps a), b) and c) (the above described activation process) are performed as a group on the catalyst contained in each reaction zone of the multiple reaction zone system.

For instance, the activation process is performed on the catalyst contained in the first reactor of the multiple reaction zone system. Thereafter, the activation process is terminated on the catalyst contained in the first reactor while reducing gas flow is maintained through the first reactor. The activation process is then commenced on the catalyst contained in the second reactor. Thereafter, the catalysts contained in reactor three and in reactor four, if present, are serially activated in a like manner. In carrying out serially the catalyst activation process of each reaction zone, the reducing gas is flowed continuously through the entire multiple reaction zone system which has been so adapted to permit continuous flow of reducing gas through individual reaction zones.

Thus, there is provided a serial activation of the multiple reaction zones with the halogen-containing compound while maintaining a continuous flow of reducing gas through the entire multiple reaction zone system with such reducing gas being introduced into the first reaction zone of the multiple reaction zone system for flow through all succeeding reactors.

Preferably, following activation and reduction with the reducing gas, the system is purged with an amount of reducing gas necessary to remove excess halogen from the catalyst. The amount of reducing gas employed during the purging process can be from about 100 to about 50,000, preferably from about 500 to about 30,000, and most preferably 1,000 to 10,000 cubic feet of reducing gas per cubic foot of catalyst. The reducing gas purge can be conducted at a temperature from about 500° F. to about 1,500° F., preferably about 800° F. to 1,100° F., and most preferably from 900° F. to 940° F., and a pressure in the range of about 0 to about 600 psig, preferably about 50 to about 300 psig.

If the reducing gas purge is conducted in a manner which exposes the catalyst to less than about 100 cubic feet of reducing gas per cubic foot of catalyst, the resulting catalyst will not meet the objects of this invention due to the existence of excessive halogen on the catalyst. If the reducing gas purge is conducted in a manner which exposes the catalyst to more than about 50,000 cubic feet of reducing gas per cubic foot of catalyst, the resulting catalyst will not meet the objects of this invention because the catalyst will not contain sufficient halogen.

In accordance with another aspect of the present invention, the catalyst activation process can comprise, consist of, or consist essentially of the following steps.

At least a portion of the water present is removed from the activation zone. This water removal can be accomplished by heating the activation zone, and the catalyst and other contents contained therein, to a temperature in the range of from about 100 to about 600° F., more preferably from about 200 to about 550° F., and most preferably from about 300 to about 500° F., while removing water. This heating removes substantially all of the free water present in the activation zone; wherein "substantially" means at least 90 volume %. The heating can be in the presence of a reducing gas.

If not already charged thereto, a reducing gas is then charged to the activation zone, preferably in a flow through mode, for reduction of any iron oxides present to thereby form reduced iron and first produced water. The reducing gas is preferably present at a partial pressure of at least about 100 psig, and more preferably at least about 125 psig. The iron oxide reduction is preferably carried out by heating the activation zone, and the catalyst and other contents contained therein, in the presence of the reducing gas, to a temperature in the range of from about 650 to about 840° F., more preferably from about 700 to about 840° F., and most preferably from about 750 to about 840° F. The reducing gas can comprise hydrogen, hydrogen sulfide and combinations thereof. This iron oxide reduction step is preferably commenced at such time when the rate of water withdrawal described above from the activation zone is below about 0.00004, more preferably below about 0.000022, and most preferably below about 0.000012 gallon of water per pound of catalyst in the activation zone.

At least a portion of the first produced water is removed from the activation zone during the iron oxide reduction, the first produced water being primarily water produced from the iron oxide reduction.

The charge of reducing gas to the activation zone is continued for the reduction of the at least one metal oxide of the catalyst to thereby form a reduced metal and second produced water. The reducing gas is preferably present at a partial pressure of at least about 100 psig, and more preferably at least about 125 psig. The at least one metal oxide reduction is preferably carried out by heating the activation zone, and the catalyst and other contents contained therein, in the presence of the reducing gas, to a temperature in the range of from about 850 to about 940° F., more preferably from about 870 to about 940° F., and most preferably from about 890 to about 930° F. The pressure of the activation zone for this step is preferably above about 200 psig, more preferably above about 250 psig, and most preferably above about 300 psig. This metal oxide reduction step is preferably commenced at such time when the rate of first produced water withdrawal from the activation zone during and following the iron oxide reduction step described above is below about 0.00004, more preferably below about 0.000022, and most preferably below about 0.000012 gallon of water per pound of catalyst in the activation zone. The reducing gas used in the metal oxide reduction step is preferably high purity hydrogen of electrolytic grade.

At least a portion of the second produced water is removed from the activation zone during the metal oxide reduction step, the water being primarily water produced from the metal oxide reduction.

The metal oxide reduction and second produced water withdrawal are continued until such time that the rate of water withdrawal is below about 0.00004, more preferably below about 0.000022, and most preferably below about 0.000012 gallon of water per pound of catalyst in the activation zone. Continuing the metal oxide reduction includes maintaining the temperature of the activation zone, and the catalyst and other contents contained therein, within the above described ranges for the metal oxide reduction.

The heating rates of each of the heating steps described above preferably do not exceed 200° F. per hour, more preferably do not exceed 150° F. per hour, and most preferably do not exceed 100° F. per hour. Heating rates exceeding those described above can result in maldistribution of heat within the activation zone.

The water removed in the water removal steps described above is preferably removed from the activation zone as a vapor, after which the vapor can then be condensed for measurement and proper disposal.

A halogen-containing compound can also be introduced to the activation zone during the metal oxide reduction step in order to halogenate the catalyst. The halogen can be fluorine, chlorine or bromine. Suitable halogen-containing compounds include, but are not limited to, a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations of any two or more thereof. The halogenation of the catalyst can be carried out during the metal oxide reduction step by the following steps.

(a) A reducing gas continuously flows over the catalyst for contact with the catalyst. The reducing gas can comprise a gas selected from the group consisting of hydrogen, hydrogen sulfide, and combinations thereof.

(b) During the continuous flowing of the reducing gas over the catalyst in step (a), a halogen-containing compound can flow over the catalyst for contact with the catalyst for a first time period, wherein the first time period is greater than about 1 minute, preferably greater than about 2 minutes, more preferably greater than about 5 minutes, and most preferably greater than about 10 minutes; and wherein the first time period is less than about 60 minutes, preferably less than about 40 minutes, more preferably less than about 30 minutes, and most preferably less than about 20 minutes.

(c) During the continuous flowing of the reducing gas over the catalyst in step (a), and following the flowing of the halogen-containing compound over the catalyst in step (b), ceasing, discontinuing or substantially discontinuing the flow of halogen-containing compound over the catalyst for a second time period, wherein the second time period is greater than about 1 minute, preferably greater than about 2 minutes, more preferably greater than about 5 minutes, and most preferably greater than about 10 minutes.

The process can further include repeating steps b) and c) at least once, or until sufficient halogen has been added to the catalyst to produce an activated catalyst. Preferably, steps b) and c) are repeated until in the range of from about 0.01 wt. % to about 2.0 wt. % halogen, more preferably until in the range of from about 0.05 wt. % to about 0.4 wt. % halogen, and most preferably until in the range of from about 0.1 wt. % to about 0.2 wt. % halogen, on an elemental basis, is added to the catalyst, based on the total weight of the catalyst.

For a multiple reaction zone system, steps a), b) and c) (the above described halogenation process) are performed as a group on the catalyst contained in each reaction zone of the multiple reaction zone system during the metal oxide reduction step.

For instance, the halogenation process is performed on the catalyst contained in the first reactor of the multiple reaction zone system. Thereafter, the halogenation process is terminated on the catalyst contained in the first reactor while reducing gas flow is maintained through the first reactor. The halogenation process is then commenced on the catalyst contained in the second reactor. Thereafter, the catalysts contained in reactor three and in reactor four, if present, are serially halogenated in a like manner. In carrying out serially the halogenation process of each reaction zone, the reducing gas flows continuously through the entire multiple reaction zone system which has been so adapted to permit continuous flow of reducing gas through individual reaction zones.

Thus, there is provided a serial halogenation of the multiple reaction zones with the halogen-containing compound while maintaining a continuous flow of reducing gas through the entire multiple reaction zone system with such reducing gas being introduced into the first reaction zone of the multiple reaction zone system.

Preferably, following halogenation and reduction with the reducing gas, the system is purged with an amount of reducing gas necessary to remove excess halogen from the catalyst. The amount of reducing gas employed during the purging process can be from about 100 to about 50,000, preferably from about 500 to about 30,000, and most preferably 1,000 to 10,000 cubic feet of reducing gas per cubic foot of catalyst. The reducing gas purge can be conducted at a temperature from about 500° F. to about 1,500° F., preferably about 800° F. to 1,100° F., and most preferably from 900° F. to 940° F., and a pressure in the range of about 0 to about 600 psig, preferably about 50 to about 300 psig.

If the reducing gas purge is conducted in a manner which exposes the catalyst to less than about 100 cubic feet of reducing gas per cubic foot of catalyst, the resulting catalyst will not meet the objects of this invention due to the existence of excessive halogen on the catalyst. If the reducing gas purge is conducted in a manner which exposes the catalyst to more than about 50,000 cubic feet of reducing gas per cubic foot of catalyst, the resulting catalyst will not meet the objects of this invention because the catalyst will not contain sufficient halogen.

The activated catalyst produced by the above described inventive processes can be used in a process to reform naphthene and paraffin-containing petroleum hydrocarbons.

Suitable petroleum hydrocarbons include gasoline boiling range hydrocarbons such as heavy straight run gasolines and naphthas. The petroleum hydrocarbons can be contacted with the inventive activated catalyst, in the presence of hydrogen, for reforming to thereby form reformate which comprises more aromatics than the petroleum hydrocarbon feed.

The following example is presented to further illustrate this invention and is not to be construed as unduly limiting its scope.

EXAMPLE

A mixture of commercially available reforming catalysts (platinum-rhenium and platinum-germanium) marketed by UOP, Des Plaines, Ill. under product designations R-62 and R-72 was used in a commercial reforming unit to reform a naphtha feed. The catalyst was activated following the procedure described herein below:

1. Remove substantially all oxygen from the unit using nitrogen purge gas.
2. Replace nitrogen in the unit with hydrogen and pressure the unit to at least 125 psig. Maintain the hydrogen partial pressure at least at 100 psig throughout the procedure. This hydrogen can be of a lower grade, such as reformer recycle hydrogen, and is charged to the unit in flow through mode.
3. Each half hour or so throughout the procedure, drain the water from the system.
4. Raise the unit outlet temperature to a temperature in the range of from about 400 to about 600° F. to remove free water in the unit.
5. Throughout the procedure, raise the unit inlet temperature by no more than about 100 to about 200° F. per hour.
6. Hold the unit at a temperature in the range of from about 400° F. to about 600° F. until water discharge has slowed to less than about 0.00004 gallons of water per pound of catalyst (4.3 gallons water per hour for this inventive run containing 107,250 lbs. of catalyst in the unit).

7. Raise the unit outlet temperature to a temperature in the range of from about 800 to about 850° F. to reduce iron oxide.
8. Hold the unit at a temperature in the range of from about 800 to about 850° F. until water discharge has slowed to less than about 0.00004 gallons of water per pound of catalyst (4.3 gallons water per hour for this inventive run).
9. Change the hydrogen source to one of a high purity (>90% hydrogen) and raise the unit pressure to a pressure in the range of from about 200 to about 300 psig.
10. Raise the unit outlet temperature to a temperature in the range of from about 900 to about 940° F., holding the maximum unit inlet temperature below about 940° F., to reduce platinum oxide and rhenium oxide.
11. Hold the unit at a temperature in the range of from about 900 to about 940° F. until water discharge has slowed to less than about 0.00004 gallons of water per pound of catalyst (4.3 gallons water per hour for this inventive run).
12. Inject a chlorine-containing compound into the unit during the platinum oxide, rhenium oxide and germanium oxide reduction step to provide chlorine on the catalyst.
13. Once reduction is complete, lower the unit inlet temperature to about 700° F. in preparation for feed introduction.

A naphtha feed was charged to the reactor for contact with the activated catalyst. Performance results are summarized in the Figure and the discussion following.

The following information is supplied regarding the Figure. Delta WAIT is an intrinsic catalyst activity term. It is a theoretical minus actual number (Delta WAIT=theoretical WAIT−actual WAIT). The theoretical number is calculated using feed quality, catalyst contact time, and product terms to determine the temperature that would be required by fresh catalyst to reform that specific feed to a specific product octane by contacting the catalyst for a specific time. The actual WAIT (weighted average inlet temperature) is the inlet temperature of a reactor multiplied by its reactor catalyst mass fraction and then summed across the reactor train.

For instance, in a four reactor unit, the actual WAIT would be calculated as follows:

$$\text{actual WAIT}=T_1M_1+T_2M_2+T_3M_3+T_4M_4;$$

wherein, for example, $T_1$=inlet temperature of the feed to reactor 1, and $M_1$=mass fraction of the total catalyst mass that is contained in the first reactor.

As the catalyst deactivates, mainly due to coke formation, the actual WAIT increases so the delta WAIT decreases in value indicating deteriorating unit performance.

nBPP=normalized barrels per pound. The measure on the x-axis is essentially a normalized catalyst life. Every data point has been corrected to a standard condition so that an equivalent comparison can be done from one run to another. There are 5 major deactivation variables and if any one or a combination of these parameters is different, and you don't correct the data to a reference, there is no way to fairly compare data from run to run.

In general the activity of a catalyst, for the purpose of deciding whether to regenerate, is judged by the Delta WAIT. The lower the Delta WAIT, the less active the catalyst. While the Delta WAIT at which regeneration is warranted varies from unit to unit, the Delta WAIT at which regeneration is warranted for the unit of this Example is around −50° F. The Delta WAIT limitation for a unit can be any of a number of operational limitations. Most common among these are the heater duty limitations for the interstage heaters. That is, when the required inlet temperature to a stage of the reactor is so high that the heater cannot provide the necessary heat, then the unit must either be regenerated or a penalty must be paid, such as lower feed throughput or product octane loss.

As can be seen from the data summarized in the Figure, the nBPP for the inventive run was around 40 at about −50° F. Delta WAIT, which is significantly higher than the nBPP of around 30 at a Delta WAIT less than −50° F. for the control run.

Higher nBPP's correspond to longer catalyst life. That is, on a normalized basis, a higher nBPP, such as that for the inventive run, results in more barrels of feed contacting each pound of catalyst.

Reasonable variations, modifications, and adaptations can be made within the scope of the disclosure and the appended claims without departing from the scope of this invention.

That which is claimed is:

1. A process for activating a catalyst comprising the steps of:
   (a) continuously flowing a reducing gas over said catalyst for contact with said catalyst;
   (b) during step a), flowing a halogen-containing compound over said catalyst for contact with said catalyst for a first time period, wherein said first time period is greater than about 1 minute, and wherein said first time period is less than about 60 minutes; and
   (c) following step b), and during step a), substantially discontinuing the flow of said halogen-containing compound over said catalyst for a second time period, wherein said second time period is greater than about 1 minute.

2. A process in accordance with claim 1 wherein said catalyst is contained in a multiple reaction zone system, and wherein steps a), b) and c) are serially performed as a group on the catalyst contained in each reaction zone of said multiple reaction zone system.

3. A process in accordance with claim 1 further characterized to include the step of:
   d) repeating steps b) and c) until sufficient halogen has been added to the catalyst to produce an activated catalyst.

4. A process comprising reforming naphthene and paraffin-containing petroleum hydrocarbons in the presence of hydrogen and a catalyst activated by the process of claim 3.

5. A process in accordance with claim 1 further characterized to include the step of:
   d) repeating steps b) and c).

6. A process in accordance with claim 1 further characterized to include the step of:
   d) repeating steps b) and c) until in the range of from about 0.01 wt. % to about 2.0 wt. % halogen, on an elemental basis, is added to said catalyst, based on the total weight of said catalyst.

7. A process in accordance with claim 1 further characterized to include the step of:
   d) repeating steps b) and c) until in the range of from about 0.05 wt. % to about 0.4 wt. % halogen, on an elemental basis, is added to said catalyst, based on the total weight of said catalyst.

8. A process according to claim 1 further characterized to include the step of:

d) repeating steps b) and c) until in the range of from about 0.1 wt. % to about 0.2 wt. % halogen, on an elemental basis, is added to said catalyst, based on the total weight of said catalyst.

9. A process according to claim 1 wherein said halogen-containing compound comprises a compound selected from the group consisting of a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations thereof.

10. A process according to claim 1 wherein said first time period is greater than about 2 minutes, and wherein said first time period is less than about 40 minutes.

11. A process according to claim 1 wherein said first time period is greater than about 5 minutes, and wherein said first time period is less than about 30 minutes.

12. A process according to claim 1 wherein said first time period is greater than about 10 minutes, and wherein said first time period is less than about 20 minutes.

13. A process according to claim 1 wherein said second time period is greater than about 2 minutes.

14. A process according to claim 1 wherein said second time period is greater than about 5 minutes.

15. A process according to claim 1 wherein said second time period is greater than about 10 minutes.

16. A process according to claim 1 wherein said catalyst comprises at least one metal selected from the group consisting of a Group VIII metal, a Group VIIB metal, tin, germanium, copper, selenium, and combinations thereof.

17. A process according to claim 16 wherein said catalyst comprises platinum.

18. A process according to claim 16 wherein said catalyst comprises platinum and rhenium.

19. A process according to claim 16 wherein said catalyst comprises platinum and germanium.

20. A process according to claim 16 wherein said catalyst comprises platinum and tin.

21. A process according to claim 1 wherein said reducing gas comprises a gas selected from the group consisting of hydrogen, hydrogen sulfide, and combinations thereof.

22. A process according to claim 1 wherein said reducing gas comprises hydrogen.

23. A process comprising reforming naphthene and paraffin-containing petroleum hydrocarbons in the presence of hydrogen and a catalyst activated by the process of claim 1.

24. A process for activating a catalyst comprising the steps of:
  a) continuously flowing a reducing gas over said catalyst for contact with said catalyst;
  (b) during step a), flowing a halogen-containing compound over said catalyst for contact with said catalyst for a first time period, wherein said first time period is greater than about 1 minute, and wherein said first time period is less than about 60 minutes;
  (c) following step b), and during step a), substantially discontinuing the flow of said halogen-containing compound over said catalyst for a second time period, wherein said second time period is greater than about 1 minute; and
  d) repeating steps b) and c) until in the range of from about 0.1 wt. % to about 2.0 wt. % halogen, on an elemental basis, is added to said catalyst, based on the total weight of said catalyst;

wherein said halogen-containing compound comprises a compound selected from the group consisting of a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations of any two or more thereof; and wherein said catalyst comprises platinum.

25. A process for activating a catalyst comprising the steps of:
  a) providing an activation zone containing water, an iron oxide, and a catalyst comprising at least one metal oxide selected from the group consisting of a Group VIII metal oxide, a Group VIIB metal oxide, tin oxide, germanium oxide, copper oxide, selenium oxide and combinations thereof;
  b) removing at least a portion of said water from said activation zone;
  c) reducing said iron oxide in the presence of a first reducing gas thereby forming reduced iron and a first produced water;
  d) removing at least a portion of said first produced water from said activation zone;
  e) reducing said at least one metal oxide of said catalyst by continuously flowing a second reducing gas over said catalyst for contact with said catalyst; thereby forming at least one reduced metal and a second produced water;
  f) removing at least a portion of said second produced water from said activation zone;
  (g) during step e), flowing a halogen-containing compound over said catalyst for contact with said catalyst for a first time period, wherein said first time period is greater than about 1 minute, and wherein said first time period is less than about 60 minutes; and
  (h) following step g), and during step e), substantially discontinuing the flow of said halogen-containing compound over said catalyst for a second time period, wherein said second time period is greater than about 1 minute.

26. A process in accordance with claim 25 wherein said catalyst is contained in a multiple reaction zone system, and wherein steps g) and h) are serially performed as a group on the catalyst contained in each reaction zone of said multiple reaction zone system.

27. A process in accordance with claim 25 further characterized to include the step of:
  d) repeating steps g) and h) until sufficient halogen has been added to the catalyst to produce an activated catalyst.

28. A process in accordance with claim 25 further characterized to include the step of:
  d) repeating steps g) and h).

29. A process in accordance with claim 25 further characterized to include the step of:
  d) repeating steps g) and h) until in the range of from about 0.01 wt. % to about 2.0 wt. % halogen, on an elemental basis, is added to said catalyst, based on the total weight of said catalyst.

30. A process in accordance with claim 25 further characterized to include the step of:
  d) repeating steps g) and h) until in the range of from about 0.05 wt. % to about 0.4 wt. % halogen, on an elemental basis, is added to said catalyst, based on the total weight of said catalyst.

31. A process according to claim 25 further characterized to include the step of:
   d) repeating steps g) and h) until in the range of from about 0.1 wt. % to about 0.2 wt. % halogen, on an elemental basis, is added to said catalyst, based on the total weight of said catalyst.

32. A process according to claim 25, wherein said halogen-containing compound comprises a compound selected from the group consisting of a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations thereof.

33. A process according to claim 25 wherein said first time period is greater than about 2 minutes, and wherein said first time period is less than about 40 minutes.

34. A process according to claim 25 wherein said first time period is greater than about 5 minutes, and wherein said first time period is less than about 30 minutes.

35. A process according to claim 25 wherein said first time period is greater than about 10 minutes, and wherein said first time period is less than about 20 minutes.

36. A process according to claim 25 wherein said second time period is greater than about 2 minutes.

37. A process according to claim 25 wherein said second time period is greater than about 5 minutes.

38. A process according to claim 25 wherein said second time period is greater than about 10 minutes.

39. A process in accordance with claim 25 wherein said step of removing at least a portion of said water in step b) is further characterized to include heating said activation zone to a temperature in the range of from about 100 to about 600° F.

40. A process in accordance with claim 39 wherein the heating rate of said activation zone does not exceed 200° F./hour.

41. A process in accordance with claim 25 wherein said step of removing at least a portion of said water in step b) is further characterized to include heating said activation zone to a temperature in the range of from about 200 to about 550° F.

42. A process in accordance with claim 25 wherein said step of removing at least a portion of said water in step b) is further characterized to include heating said activation zone to a temperature in the range of from about 300 to about 500° F.

43. A process in accordance with claim 25 wherein said step of removing at least a portion of said first produced water in step d) is further characterized to include heating said activation zone to a temperature in the range of from about 650 to about 840° F.

44. A process in accordance with claim 43 wherein the heating rate of said activation zone does not exceed 200° F./hour.

45. A process in accordance with claim 25 wherein said step of removing at least a portion of said first produced water in step d) is further characterized to include heating said activation zone to a temperature in the range of from about 700 to about 840° F.

46. A process in accordance with claim 25 wherein said step of removing at least a portion of said first produced water in step d) is further characterized to include heating said activation zone to a temperature in the range of from about 750 to about 840° F.

47. A process in accordance with claim 25 wherein said step of removing at least a portion of said second produced water in step f) is further characterized to include heating said activation zone to a temperature in the range of from about 850 to about 940° F.

48. A process in accordance with claim 47 wherein the heating rate of said activation zone does not exceed 200° F./hour.

49. A process in accordance with claim 25 wherein said step of removing at least a portion of said second produced water in step f) is further characterized to include heating said activation zone to a temperature in the range of from about 870 to about 940° F.

50. A process in accordance with claim 25 wherein said step of removing at least a portion of said second produced water in step f) is further characterized to include heating said activation zone to a temperature in the range of from about 890 to about 930° F.

51. A process in accordance with claim 25 wherein said reducing said iron oxide in step c) commences at such time that the rate of water removal in step b) is below about 0.00004 gallon of water per pound of said catalyst in said activation zone.

52. A process in accordance with claim 25 wherein said reducing said iron oxide in step c) commences at such time that the rate of water removal in step b) is below about 0.000022 gallon of water per pound of said catalyst in said activation zone.

53. A process in accordance with claim 25 wherein said reducing said iron oxide in step c) commences at such time that the rate of water removal in step b) is below about 0.000012 gallon of water per pound of said catalyst in said activation zone.

54. A process in accordance with claim 25 wherein said reducing said at least one metal oxide in step e) commences at such time that the rate of water removal in step d) is below about 0.00004 gallon of water per pound of said catalyst in said activation zone.

55. A process in accordance with claim 25 wherein said reducing said at least one metal oxide in step e) commences at such time that the rate of water removal in step d) is below about 0.000022 gallon of water per pound of said catalyst in said activation zone.

56. A process in accordance with claim 25 wherein said reducing said at least one metal oxide in step e) commences at such time that the rate of water removal in step d) is below about 0.000012 gallon of water per pound of said catalyst in said activation zone.

57. A process in accordance with claim 25 wherein water is removed from said activation zone in step f) until such time that the rate of water withdrawal is below about 0.00004 gallon of water per pound of said catalyst in said activation zone.

58. A process in accordance with claim 25 wherein water is removed from said activation zone in step f) until such time that the rate of water withdrawal is below about 0.000022 gallon of water per pound of said catalyst in said activation zone.

59. A process in accordance with claim 25 wherein water is removed from said activation zone in step f) until such time that the rate of water withdrawal is below about 0.000012 gallon of water per pound of said catalyst in said activation zone.

60. A process in accordance with claim 25 wherein said activation zone is further characterized to include multiple catalyst containment zones.

61. A process in accordance with claim 25 wherein said at least one metal oxide comprises platinum oxide.

62. A process in accordance with claim 25 wherein said at least one metal oxide comprises platinum oxide and rhenium oxide.

63. A process in accordance with claim 25 wherein said at least one metal oxide comprises platinum oxide and germanium oxide.

64. A process in accordance with claim 25 wherein said at least one metal oxide comprises platinum oxide and tin oxide.

65. A process in accordance with claim 25 wherein water removed from said activation zone in steps b), d), and f) is withdrawn as a vapor.

66. A process in accordance with claim 25 wherein said first reducing gas and said second reducing gas each comprise a gas selected from the group consisting of hydrogen, hydrogen sulfide, and combinations thereof.

67. A process in accordance with claim 25 wherein said first reducing gas and said second reducing gas each comprise hydrogen.

68. A process in accordance with claim 25 wherein the pressure of said activation zone in step e) is at least about 200 psig.

69. A process in accordance with claim 25 wherein said first reducing gas in step c) and said second reducing gas in step e) is present at a partial pressure of at least about 100 psig.

70. A process in accordance with claim 25 wherein said second reducing gas of step e) comprises hydrogen of electrolytic grade.

71. A process comprising reforming naphthene and paraffin-containing petroleum hydrocarbons in the presence of hydrogen and a catalyst activated by the process of claim 25.

72. A process for activating a catalyst comprising the steps of:

a) heating a catalyst in an activation zone to a temperature in the range of from about 100 to about 600° F., wherein said catalyst comprises at least one metal oxide selected from the group consisting of a Group VIII metal oxide, a Group VIIB metal oxide, tin oxide, germanium oxide, copper oxide, selenium oxide and combinations thereof;

b) withdrawing water from said activation zone during said heating of step a);

c) heating said catalyst in said activation zone and in the presence of a first reducing gas to a temperature in the range of from about 650 to about 840° F., thus producing a first produced water, at a first point in time at which the rate of water withdrawal in step b) from said activation zone is below about 0.00004 gallon of water per pound of said catalyst in said activation zone;

d) withdrawing at least a portion of said first produced water from said activation zone during said heating of step c);

e) heating said catalyst in said activation zone to a temperature in the range of from about 850 to about 940° F. and continuously flowing a second reducing gas over said catalyst for contact with said catalyst, thus producing a second produced water, at a second point in time at which the rate of said first produced water withdrawal in step d) from said activation zone is below about 0.00004 gallon of water per pound of said catalyst in said activation zone;

f) withdrawing at least a portion of said second produced water from said activation zone during said heating of step e);

g) maintaining the temperature of said catalyst in said activation zone in the range of from about 850 to about 940° F. until a third point in time at which the rate of said second produced water withdrawal in step f) is below about 0.00004 gallon of water per pound of said catalyst in said activation zone;

h) during step e), flowing a halogen-containing compound over said catalyst for contact with said catalyst for a first time period, wherein said first time period is greater than about 1 minute, and wherein said first time period is less than about 60 minutes; and i) following step h), and during step e), substantially discontinuing the flow of said halogen-containing compound over said catalyst for a second time period, wherein said second time period is greater than about 1 minute.

73. A process in accordance with claim 72 wherein said catalyst is contained in a multiple reaction zone system, and wherein steps h) and i) are serially performed as a group on the catalyst contained in each reaction zone of said multiple reaction zone system.

74. A process in accordance with claim 72 further characterized to include the step of:

j) repeating steps h) and i) until sufficient halogen has been added to the catalyst to produce an activated catalyst.

75. A process in accordance with claim 72 further characterized to include the step of:

j) repeating steps h) and i).

76. A process in accordance with claim 72, further characterized to include the step of:

j) repeating steps h) and i) until in the range of from about 0.01 wt. % to about 2.0 wt. % halogen, on an elemental basis, is added to said catalyst, based on the total weight of said catalyst.

77. A process in accordance with claim 72 further characterized to include the step of:

j) repeating steps h) and i) until in the range of from about 0.05 wt. % to about 0.4 wt. % halogen, on an elemental basis, is added to said catalyst, based on the total weight of said catalyst.

78. A process according to claim 72 further characterized to include the step of:

j) repeating steps h) and i) until in the range of from about 0.1 wt. % to about 0.2 wt. % halogen, on an elemental basis, is added to said catalyst, based on the total weight of said catalyst.

79. A process according to claim 72 wherein said halogen-containing compound comprises a compound selected from the group consisting of a Group IIIA metal chloride, a Group V metal chloride, tetrachloroethylene, hexachloroethane, carbon tetrachloride, 1-chlorobutane, 2-chlorobutane, 1-chloro-2-methylpropane, 2-chloro-2-methylpropane, tertiary butyl chloride, propylene dichloride, perchloroethylene, hydrogen chloride, and combinations thereof.

80. A process according to claim 72 wherein said first time period is greater than about 2 minutes, and wherein said first time period is less than about 40 minutes.

81. A process according to claim 72 wherein said first time period is greater than about 5 minutes, and wherein said first time period is less than about 30 minutes.

82. A process according to claim 72 wherein said first time period is greater than about 10 minutes, and wherein said first time period is less than about 20 minutes.

83. A process according to claim 72 wherein said second time period is greater than about 2 minutes.

84. A process according to claim 72 wherein said second time period is greater than about 5 minutes.

85. A process according to claim 72 wherein said second time period is greater than about 10 minutes.

86. A process in accordance with claim 72 wherein the heating rate in steps a), c) and e) do not exceed 200° F./hour.

87. A process in accordance with claim 72 wherein the heating rate in steps a), c) and e) do not exceed 150° F./hour.

88. A process in accordance with claim 72 wherein the heating rate in steps a), c) and e) do not exceed 100° F./hour.

89. A process in accordance with claim 72 wherein said heating of said catalyst in step a) is to a temperature in the range of from about 200 to about 550° F.

90. A process in accordance with claim 72 wherein said heating of said catalyst in step a) is to a temperature in the range of from about 300 to about 500° F.

91. A process in accordance with claim 72 wherein said heating of said catalyst in step c) is to a temperature in the range of from about 700 to about 840° F.

92. A process in accordance with claim 72 wherein said heating of said catalyst in step c) is to a temperature in the range of from about 750 to about 840° F.

93. A process in accordance with claim 72 wherein said heating of said catalyst in step e) is to a temperature in the range of from about 870 to about 940° F.

94. A process in accordance with claim 72 wherein said heating of said catalyst in step e) is to a temperature in the range of from about 890 to about 930° F.

95. A process in accordance with claim 72 wherein said activation zone is further characterized to include multiple catalyst containment zones.

96. A process in accordance with claim 72 wherein said at least one metal oxide comprises platinum oxide.

97. A process in accordance with claim 72 wherein said at least one metal oxide comprises platinum oxide and rhenium oxide.

98. A process in accordance with claim 72 wherein said at least one metal oxide comprises platinum oxide and germanium oxide.

99. A process in accordance with claim 72 wherein said at least one metal oxide comprises platinum oxide and tin oxide.

100. A process in accordance with claim 72 wherein water withdrawn from said activation zone in steps b), d) and f) is withdrawn as a vapor.

101. A process in accordance with claim 72 wherein said first reducing gas and said second reducing gas each comprise a gas selected from the group consisting of hydrogen, hydrogen sulfide, and combinations thereof.

102. A process in accordance with claim 72 wherein said first reducing gas and said second reducing gas each comprise hydrogen.

103. A process in accordance with claim 72 wherein said first point in time in step c) is when the rate of water withdrawal in step b) from said activation zone is below about 0.000022 gallon of water per pound of said catalyst in said activation zone.

104. A process in accordance with claim 72 wherein said second point in time in step e) is when the rate of said first produced water withdrawal in step d) from said activation zone is below about 0.000022 gallon of water per pound of said catalyst in said activation zone.

105. A process in accordance with claim 72 wherein said third point in time in step g) is when the rate of said second produced water withdrawal in step f) from said activation zone is below about 0.000022 gallon of water per pound of said catalyst in said activation zone.

106. A process in accordance with claim 72 wherein the pressure of said activation zone in step e) is at least about 200 psig.

107. A process in accordance with claim 72, wherein said first reducing gas in step c) and said second reducing gas in step e) is present at a partial pressure of at least about 100 psig.

108. A process in accordance with claim 72 wherein said second reducing gas of step e) comprises hydrogen of electrolytic grade.

109. A process comprising reforming naphthene and paraffin-containing petroleum hydrocarbons in the presence of hydrogen and a catalyst activated by the process of claim 72.

* * * * *

UNITED STATES PATENT AND TRADEMARK OFFICE
CERTIFICATE OF CORRECTION

PATENT NO.    : 6,593,264 B2
DATED         : July 15, 2003
INVENTOR(S)   : Fan-Nan Lin et al.

It is certified that error appears in the above-identified patent and that said Letters Patent is hereby corrected as shown below:

<u>Column 16,</u>
Line 55, delete "perchioroethylene" and insert therefor -- perchloroethylene --.

Signed and Sealed this

Twenty-ninth Day of June, 2004

JON W. DUDAS
*Acting Director of the United States Patent and Trademark Office*